United States Patent
Von Deylen

(10) Patent No.: US 12,378,744 B2
(45) Date of Patent: Aug. 5, 2025

(54) SOLAR TRACKER INTERFACE AND METHOD

(71) Applicant: APA SOLAR, LLC, Ridgeville Corners, OH (US)

(72) Inventor: Joseph Von Deylen, Whitehouse, OH (US)

(73) Assignee: APA SOLAR, LLC, Ridgeville Corners, OH (US)

( * ) Notice: Subject to any disclaimer, the term of this patent is extended or adjusted under 35 U.S.C. 154(b) by 0 days.

(21) Appl. No.: 18/301,716

(22) Filed: Apr. 17, 2023

(65) Prior Publication Data

US 2023/0332368 A1   Oct. 19, 2023

Related U.S. Application Data

(60) Provisional application No. 63/331,417, filed on Apr. 15, 2022.

(51) Int. Cl.
| | | |
|---|---|---|
| *E04H 12/22* | (2006.01) | |
| *E02D 27/50* | (2006.01) | |
| *F16M 13/02* | (2006.01) | |
| *H02S 20/10* | (2014.01) | |

(52) U.S. Cl.
CPC ............ *E02D 27/50* (2013.01); *F16M 13/02* (2013.01); *H02S 20/10* (2014.12); *E04H 12/2215* (2013.01)

(58) Field of Classification Search
CPC ........ A01G 9/122; A45F 3/44; E04H 12/2215
USPC ....... 248/156, 159; 52/153, 157, 165, 169.9, 52/170
See application file for complete search history.

(56) References Cited

U.S. PATENT DOCUMENTS

| | | | | |
|---|---|---|---|---|
| 2,357,819 | A * | 9/1944 | Greer ........................ | G09F 7/00 160/369 |
| 3,583,466 | A * | 6/1971 | Dreyer .................... | G03B 21/58 160/381 |
| 3,865,309 | A * | 2/1975 | Greenhalgh .............. | B05B 1/20 47/33 |
| 4,866,866 | A * | 9/1989 | Rotter ................. | G09F 15/0062 40/610 |
| 5,860,654 | A * | 1/1999 | Jacobs ........................ | F41J 1/10 273/407 |
| 5,881,978 | A * | 3/1999 | Rust ..................... | E04H 12/2215 40/607.08 |
| 6,145,528 | A * | 11/2000 | Egnew ................... | E04H 15/003 135/128 |

(Continued)

*Primary Examiner* — Alfred J Wujciak
(74) *Attorney, Agent, or Firm* — Jacob M. Ward; Ward Law Office LLC

(57) ABSTRACT

Embodiments of the present disclosure may include a solar panel foundation system and method of installation. The foundation system including a bracket configured to be coupled to and support the solar panel, and a cross-brace. The cross-brace configured to be slidably adjustable between a first end and a second end. There may be a first member and a second member each configured to be coupled at one end to the bracket and to the cross-brace at another end. There may be a third member and a fourth member configured to be coupled to the cross-brace at one end, and to be coupled to a first pile and a second pile at another end. After assembly of the foundation system, the first and second piles may be driven into the surface, and the solar panel to be installed onto the bracket of the foundation system.

6 Claims, 11 Drawing Sheets

(56) References Cited

U.S. PATENT DOCUMENTS

| | | | |
|---|---|---|---|
| 7,797,869 B2* | 9/2010 | Tollis | G09F 15/0037 |
| | | | 40/607.04 |
| 2009/0077849 A1* | 3/2009 | Glass, Jr. | G09F 15/00 |
| | | | 40/606.03 |
| 2010/0257794 A1* | 10/2010 | Stark | E02D 5/80 |
| | | | 52/165 |
| 2011/0127723 A1* | 6/2011 | Haynes | F41J 1/10 |
| | | | 273/407 |
| 2021/0249986 A1 | 8/2021 | Von Deylen | |

* cited by examiner

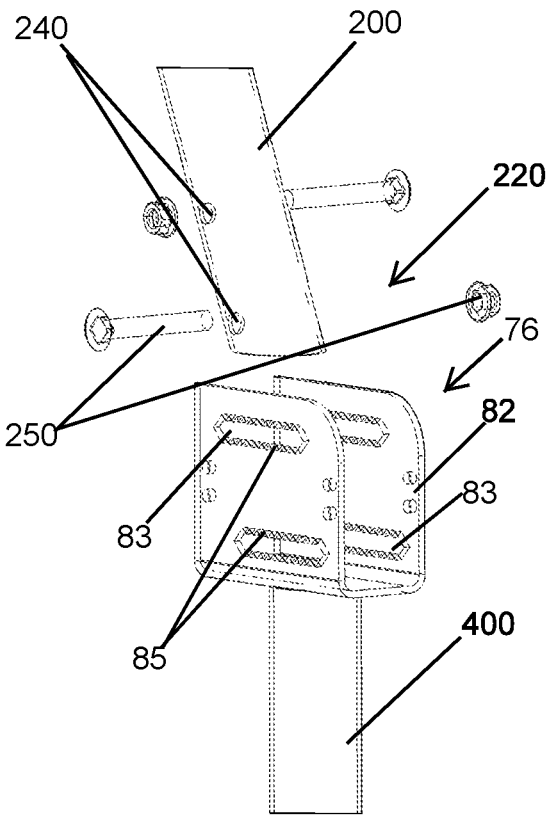
FIG. 3
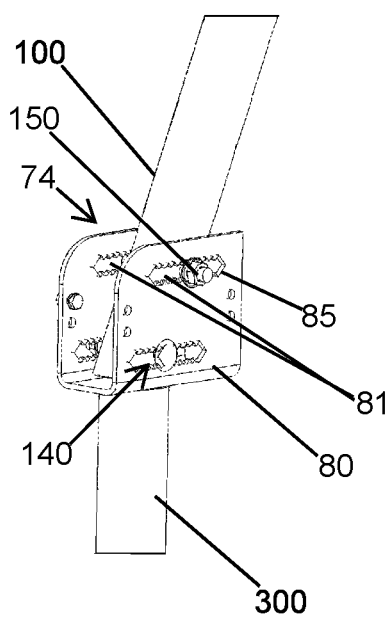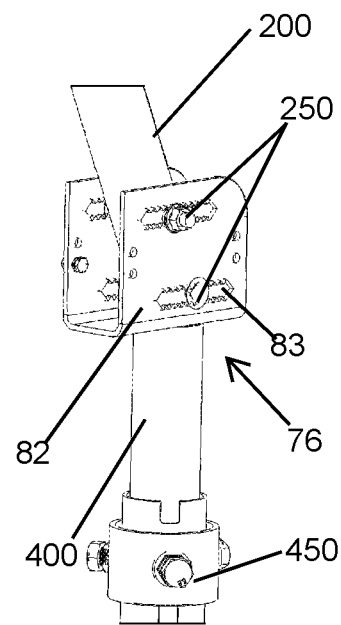
FIG. 4

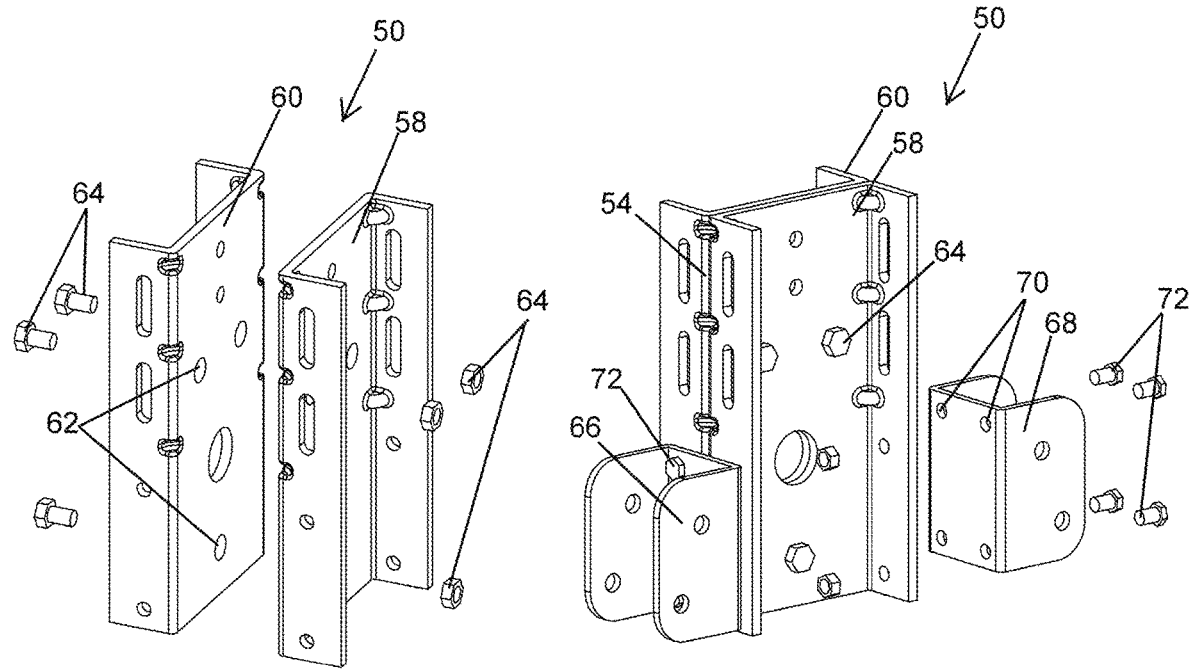
FIG. 7  FIG. 8
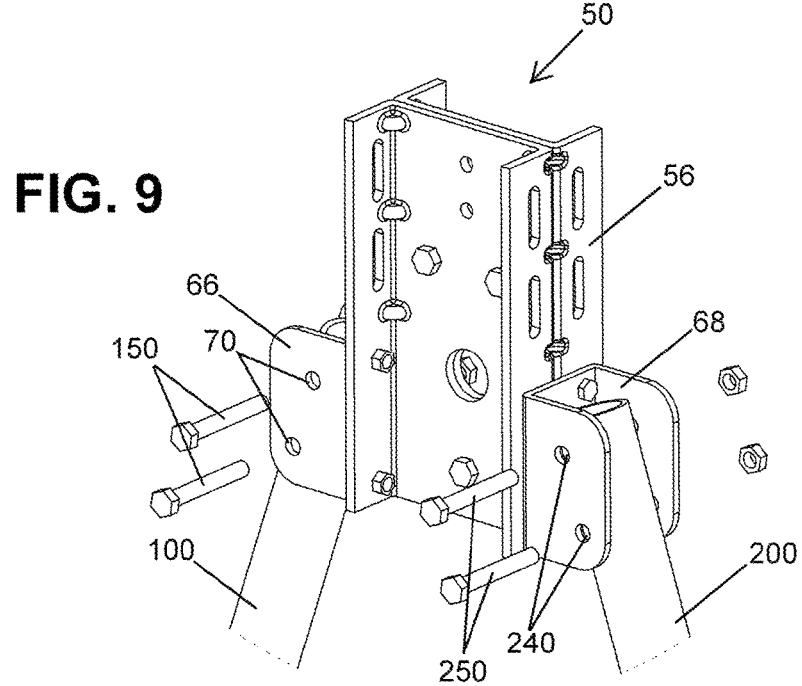
FIG. 9

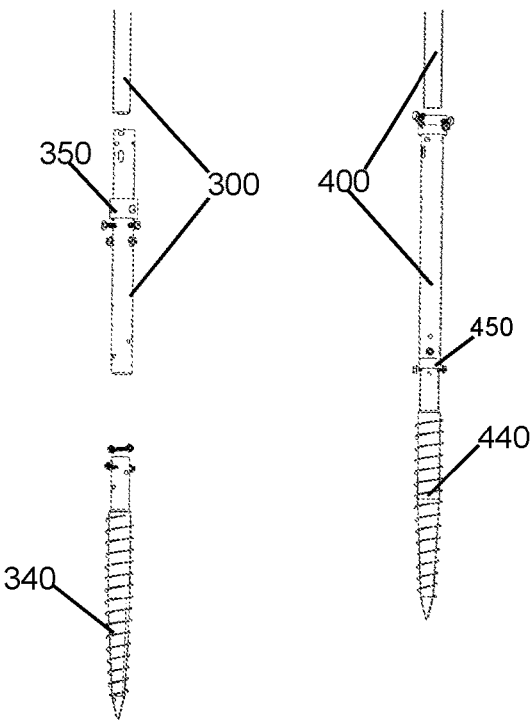
FIG. 10
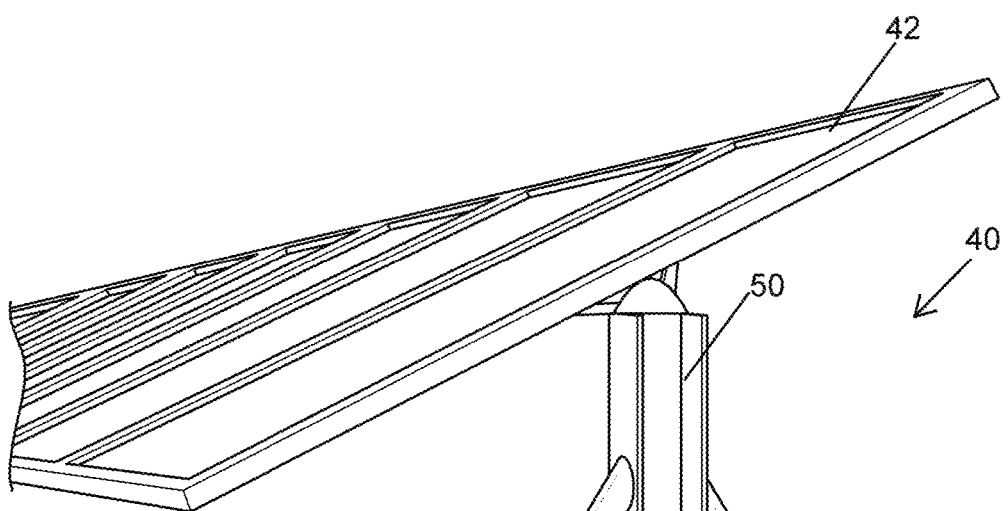
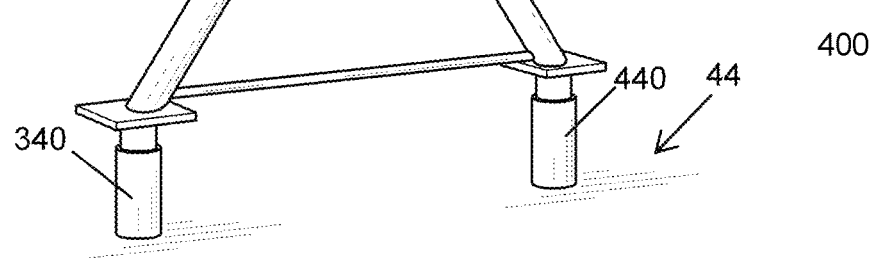
FIG. 11

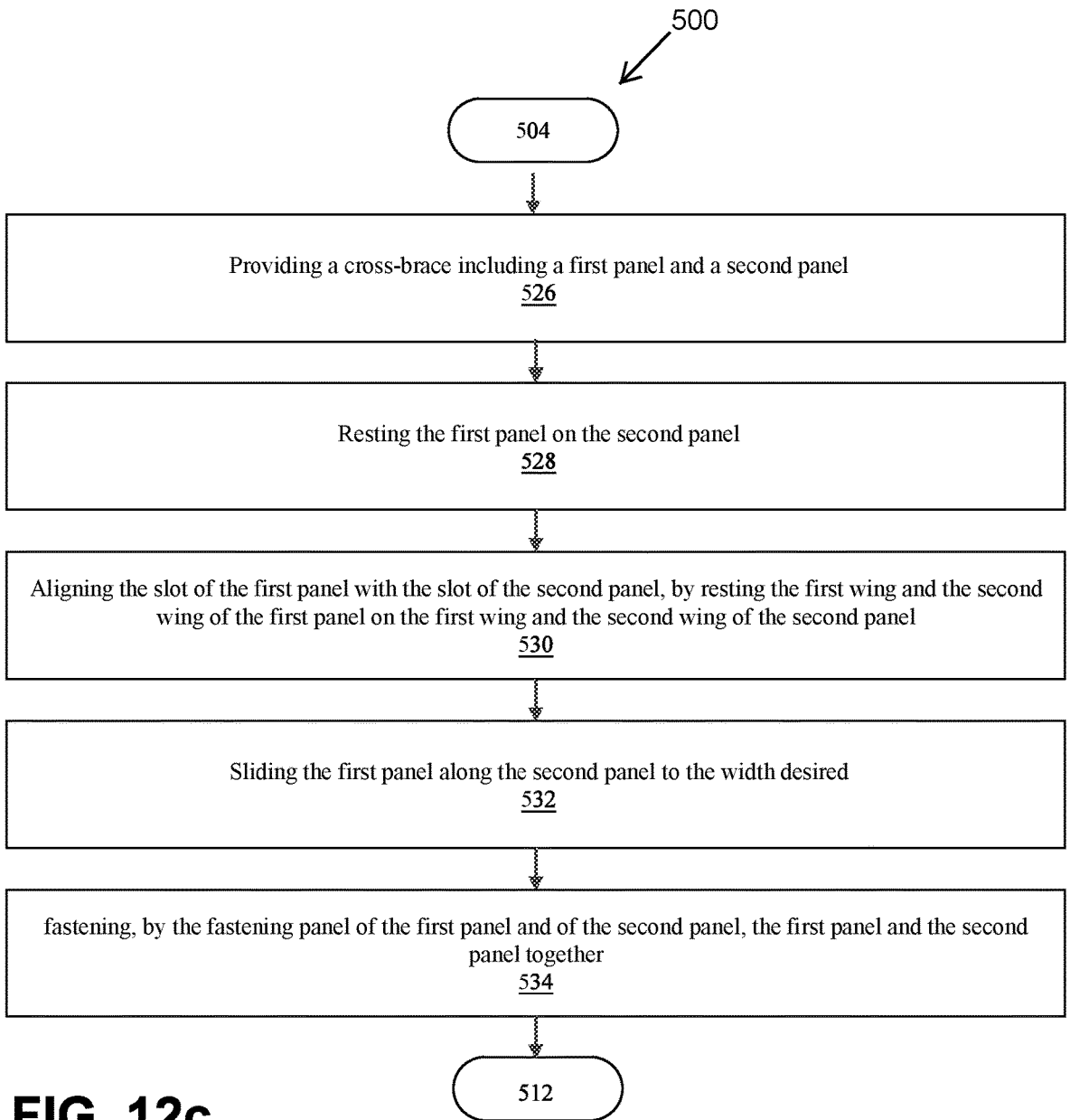

SOLAR TRACKER INTERFACE AND METHOD

CROSS-REFERENCE TO RELATED APPLICATIONS

This application claims the benefit of U.S. Provisional Application No. 63/331,417, filed on Apr. 15, 2022. The entire disclosure of the above application is incorporated by reference.

FIELD

The present technology includes processes and articles of manufacture that relate to solar foundations, including a system and method for a solar panel foundation, which may be assembled onsite.

INTRODUCTION

This section provides background information related to the present disclosure which is not necessarily prior art.

Installing solar panels using solar panel foundation systems can be difficult on sites with rough terrain having loose or frozen soil, or uneven topography. A-frame solar panel foundations make installation on such sites more economical. Traditional solar panel foundations often employ a single driven pile to reach a depth necessary to support the load of a solar panel system. Traditional foundations with single driven piles rely on skin friction, and a deeper embedment to combat rough terrain.

Alternatively, an A-frame solar panel foundation with a dual post design spreads out the support load between posts, and can utilize shallower drive depths to combat rough terrain, especially with use of piles such as ground or helical screws. Piles configured as ground or helical screws do not rely on skin friction and thus mitigate the risk of frost heave due to icy soil. Ground or helical screws also allow faster and more cost-effective installation of solar panel systems on sites with rock, bedrock, glacial till, or caliche soils faster as compared to traditional piles. Helical screws are even useable with soft, organic, or sandy soils. Further, because the dual post design disperses the support load, an A-frame foundation may be manufactured with lighter weight materials, making transport and set-up easier.

Traditionally, A-frame solar panel foundations must be manufactured on a per-project basis. Unfortunately, it is not possible to premanufacture a quantity of A-frame foundations before they are sold. Given these limitations, the A-frame foundations must be welded together and galvanized before shipping, and generally arrive on-site pre-assembled.

Accordingly, there is a need for a system and method for a solar panel foundation that may be easily manufactured, shipped, and assembled onsite.

SUMMARY

In concordance with the instant disclosure, a system and method for a solar panel foundation that may be easily manufactured, shipped, and assembled onsite is surprisingly discovered. The present technology includes articles of manufacture, systems, and processes that relate to solar panel foundation systems.

In one embodiment, a foundation system for a solar panel includes a bracket configured to be coupled to and support the solar panel. The solar panel foundation may have a first member, a second member, a first brace, a second brace, a third member, and a fourth member. The first member may include a first end and a second end, the first end configured to be coupled to the bracket. The second member may include a first end and a second end, the first end configured to be coupled to the bracket. The first brace may be configured to be coupled to the second end of the first member. The second brace may be configure to be coupled to the second end of the second member. The third member may include a first end and a second end, the first end configured to be coupled to the first brace. The fourth member may include a first end and a second end, the first end configured to be coupled to the second brace.

Another embodiment includes a method of building and installing a foundation system in a surface for supporting a solar panel. The method may include providing a foundation system for a solar panel. The solar panel foundation may have a first member, a second member, a first brace, a second brace, a third member, and a fourth member. The first member may include a first end and a second end, the first end configured to be coupled to the bracket. The second member may include a first end and a second end, the first end configured to be coupled to the bracket. The first brace may be configured to be coupled to the second end of the first member. The second brace may be configure to be coupled to the second end of the second member. The third member may include a first end and a second end, the first end configured to be coupled to the first brace. The fourth member may include a first end and a second end, the first end configured to be coupled to the second brace. The method may further include one or more of the following aspects: coupling the second end of the third member to a first pile installed in the surface, coupling the second end of the fourth member to a second pile installed in the surface. coupling the second end of the first member to the first brace, coupling the second end of the second member to the second brace, coupling the first end of the first member to a first side of the bracket, and coupling the first end of the second member to a second side of the bracket, and installing the solar panel on the bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is partial exploded perspective view of one embodiment of the second brace of the solar panel foundation showing the second brace with serrated slots, and receiving the a first member.

FIG. 4 is a partial perspective view of the assembled solar panel foundation showing the first member coupled to the first brace, and the second member coupled to the second brace.

Figure 6A:
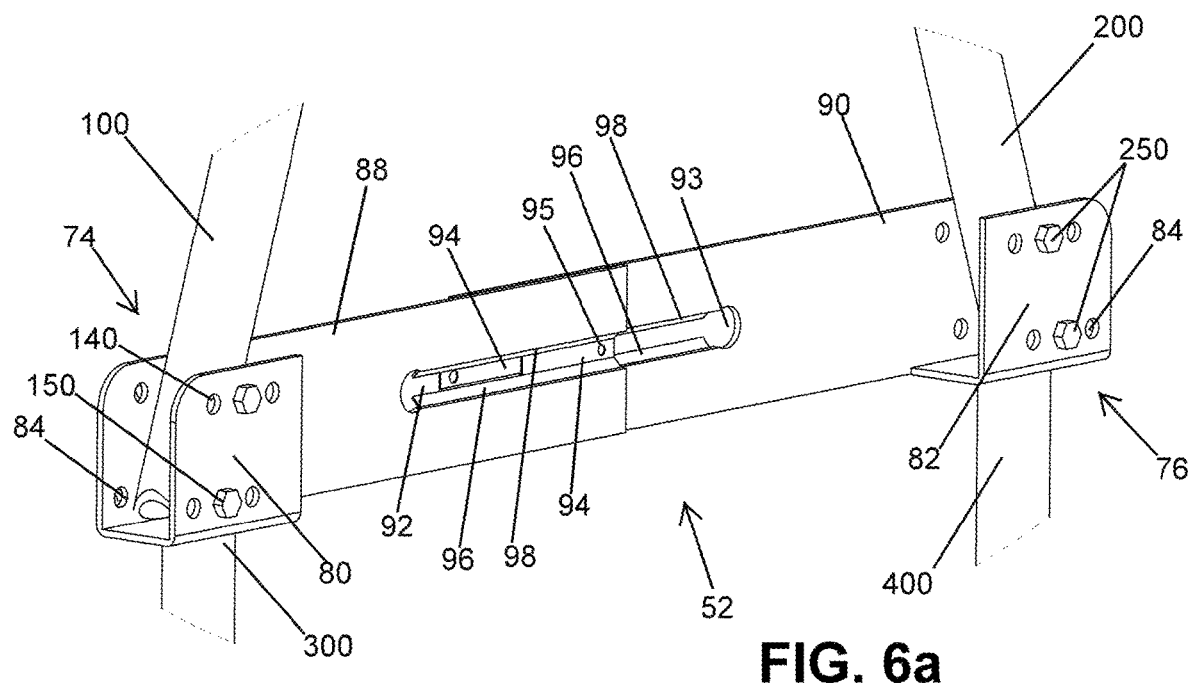
FIG. 6a is a partial perspective view of another embodiment of the solar panel foundation including the slidably adjustable cross-brace.
Figure 6B:
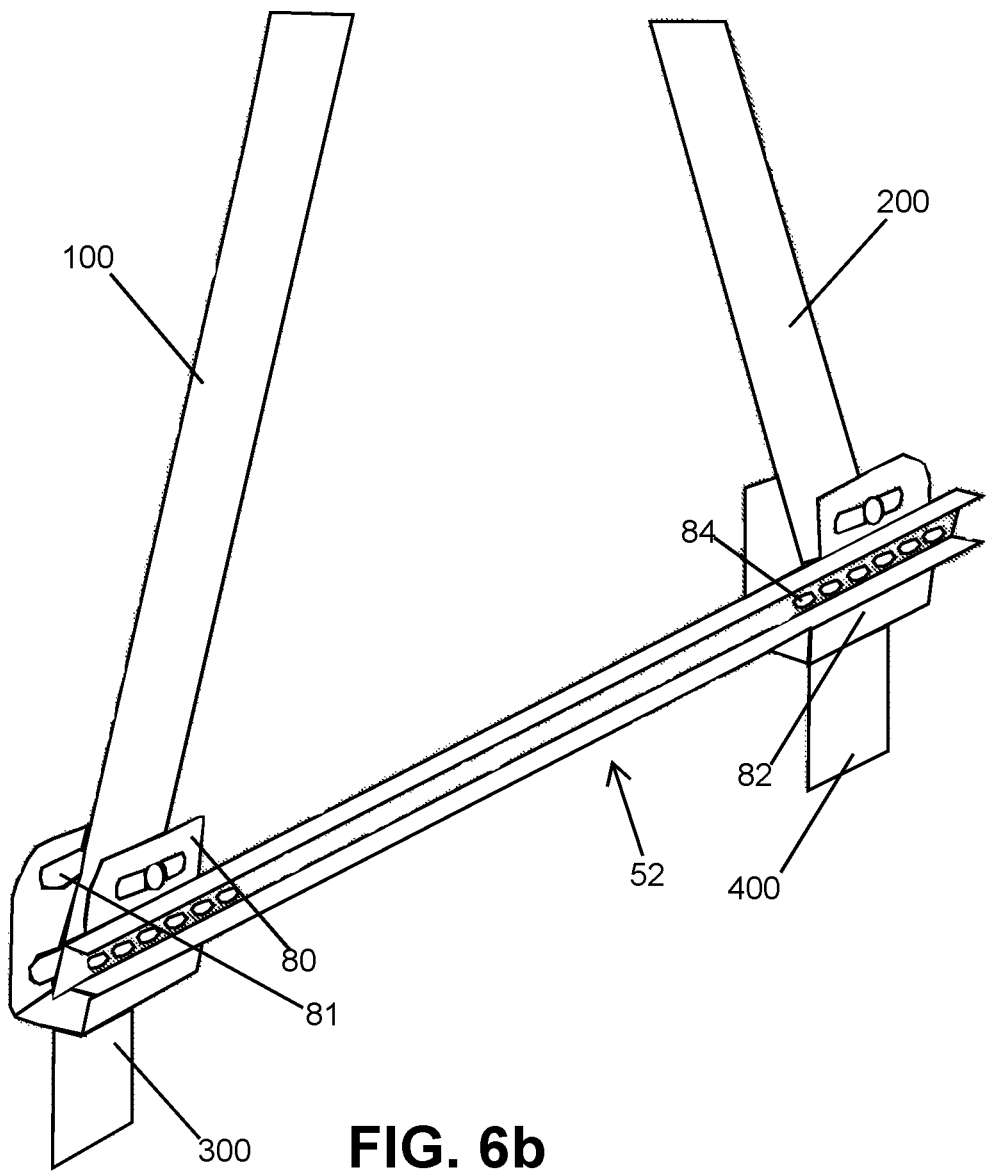

FIG. 6b a partial perspective view of another embodiment of the solar panel foundation cross-brace.

FIG. 7 is an exploded perspective view of the bracket of the solar panel foundation.

FIG. 8 is an exploded perspective view of the bracket, including the first attachment bracket and second attachment bracket of the solar panel foundation.

FIG. 9 is a partial perspective view of the first member and the second member coupled to the bracket, including an exploded perspective view of a plurality of fasteners.

FIG. 10 is a partial exploded perspective view of one embodiment of the solar tracker foundation with a telescoping third member and fourth member.

FIG. 11 is a perspective view of the solar tracker foundation in use, coupled to a solar panel, the solar panel foundation driven into the surface.

FIGS. 12a-12d are flowcharts representing methods of building and installing a one embodiment of the solar panel foundation system in the surface.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
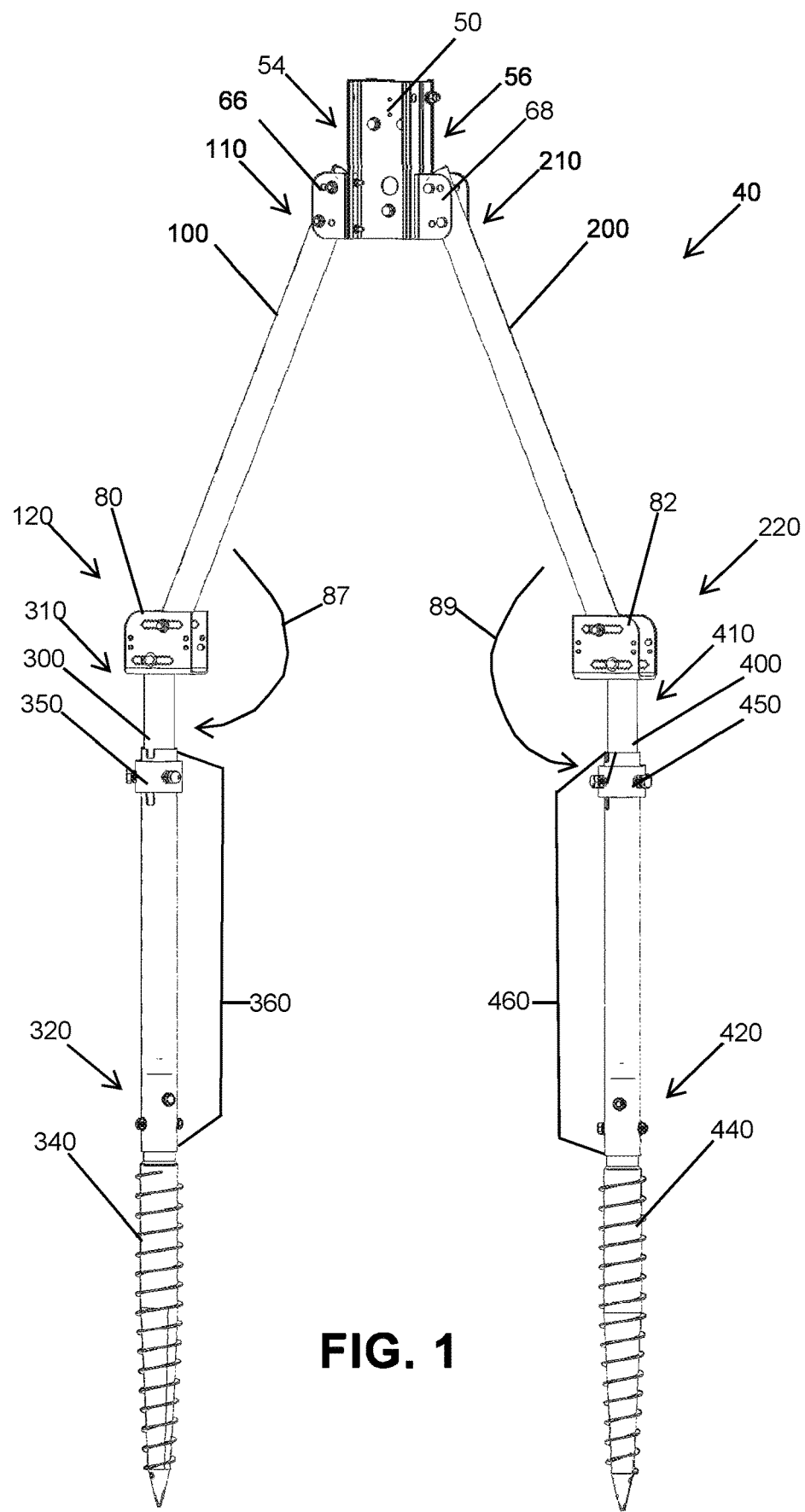
FIG. 1 is a perspective view of one embodiment of the solar panel foundation of the present disclosure.

The present technology improves on foundation systems for solar panels. FIG. 1 shows an embodiment of a foundation system 40 for a solar panel 42 constructed in accordance with the present disclosure. The foundation system 40 may include a bracket 50, a first member 100, a second member 200, a first brace 80, a second brace 82, a third member 300, and a fourth member 400.

Figure 2:
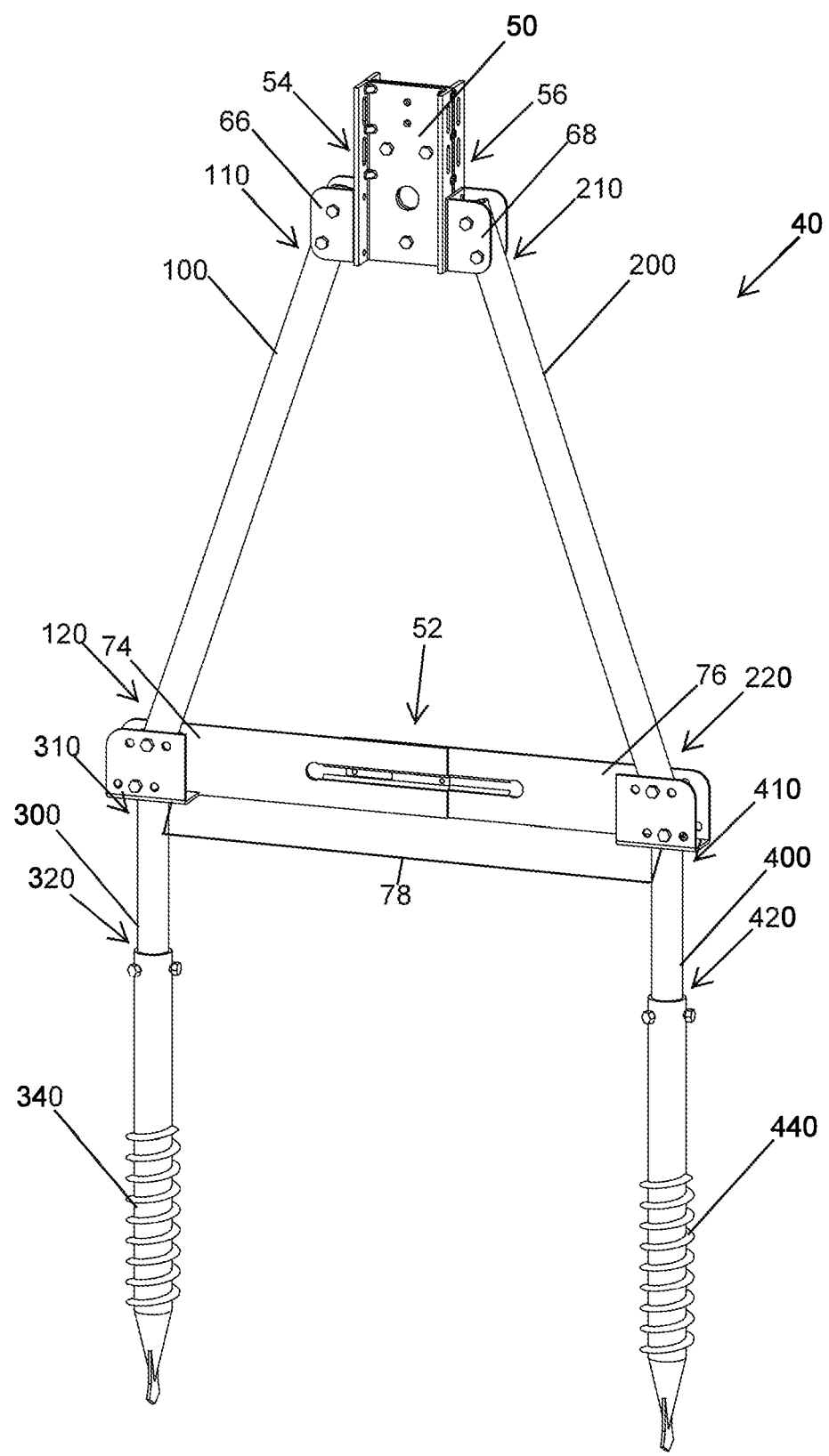
FIG. 2 is a perspective view of another embodiment of the solar panel foundation of the present disclosure.

FIG. 2 shows another embodiment of the foundation system 40 for the solar panel 42 constructed in accordance with the present disclosure. The foundation system 40 may include the bracket 50, a cross-brace 52, the first member 100, the second member 200, the third member 300, and the fourth member 400.

As shown in FIGS. 1, 2 and 11, the bracket 50 may be configured to be coupled to, and support the solar panel 42. The bracket 50 may include a first side 54, and a second side 56. In a particular embodiment, as shown in FIG. 7, the bracket 50 may be formed from a first U-beam 58, coupled to a second U-beam 60. The first U-beam 58 and the second U-beam 60, once aligned, may form a plurality of holes 62 therethrough, which may be configured to receive a plurality of fasteners 64, as shown in FIG. 7. The plurality of fasteners 64 may be of any type deemed appropriate by one skilled in the art, including but not limited to the nut and bolt configuration shown in FIG. 7.

Figure 5:
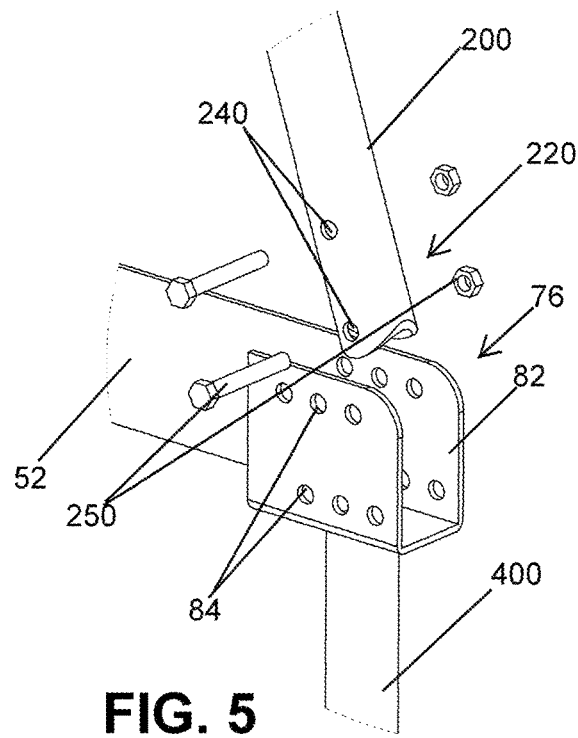
FIG. 5 is a partial exploded perspective view of another embodiment of the second brace of the solar panel foundation showing the second brace with a plurality of holes receiving the first member, and the cross-brace.

As shown in FIGS. 8-9, the first side 54 of the bracket 50 may be configured to be coupled to a first attachment bracket 66. The second side 56 of the bracket 50 may be configured to be coupled to a second attachment bracket 68. As shown in FIGS. 1-2, 4, and 6, the first attachment bracket 66 may be configured to accept the first member 100, and the second attachment bracket 68 may be configured to accept the second member 200. As shown in FIGS. 5-6, the first attachment bracket 66, and the second attachment bracket 68 may have a plurality of holes 70 configured to receive a plurality of fasteners 72. The plurality of holes 70 may align with the plurality of holes 62 of the bracket 50, allowing the first attachment bracket 66, and the second attachment bracket 68 to be fastened to the bracket 50.

In a particular embodiment, as shown in FIGS. 8-9, the first attachment bracket 66 and the second attachment bracket 68 are U-shaped brackets. However, any shape or type of hardware may be used as deemed appropriate by one skilled in the art. Additionally, the plurality of fasteners 72 used may be of any type deemed appropriate by one skilled in the art, including, but not limited to the nut and bolt configuration shown in FIG. 5-6.

As shown in FIGS. 1 and 2, the first member 100 may include a first end 110 and a second end 120. The first end 110 may be configured to be coupled to the first side 54 of the bracket 50. In some embodiments, as shown in FIG. 8, the first end 110 may be configured to be coupled to the first attachment bracket 66 of the bracket 50. As shown in FIGS. 4 and 6, the second end 120 may be configured to be coupled to the first brace 80. There may be a plurality of holes 140 formed in the first end 110 and in the second end 120 of the first member 100. The plurality of holes 140 may be configured to receive a plurality of fasteners 150. In particular, the plurality of holes 140 of the first end 110 may align with the plurality of holes 70 of the first attachment bracket 66. The plurality of fasteners 150 may then be used to fasten the first end 110 to the first attachment bracket 66. Further, the plurality of holes 140 of the second end 120 may align with the first brace 80. The plurality of fasteners 150 may then be used to fasten the second end 120 to the first brace 80.

In a particular embodiment, as shown in FIGS. 2-3, the first member 100 may be tube-shaped, however, any shape may be used as deemed appropriate by one skilled in the art. Additionally, the plurality of fasteners 150 used may be of any type deemed appropriate by one skilled in the art, including, but not limited to the nut and bolt configuration shown in FIGS. 3 and 6.

As show in FIGS. 1 and 2, the second member 200 may include a first end 210 and a second end 220. The first end 210 may be configured to be coupled to the second side 56 of the bracket 50, and the second end 220 may be configured to be coupled to the second end 76 of the cross-brace 52. In some embodiments, as shown in FIG. 8, the first end 210 may be configured to be coupled to the second attachment bracket 68 of the bracket 50. As shown in FIGS. 3-6, the second end 220 may be configured to be coupled to the second brace 82. There may be a plurality of holes 240 formed in the first end 210 and in the second end 220 of the second member 200. The plurality of holes 240 may be configured to receive a plurality of fasteners 250. In particular, the plurality of holes 240 of the first end 210, may align with the plurality of holes 70 of the second attachment bracket 68. The plurality of fasteners 250 may then be used to fasten the first end 210 to the second attachment bracket 68. Further, the plurality of holes 240 of the second end 220, may align with the second brace 82. The plurality of fasteners 250 may then be used to fasten the second end 120 to the first brace 80.

In a particular embodiment, as shown in FIGS. 2-3, the second member 200 may be tube-shaped, however, any shape may be used as deemed appropriate by one skilled in the art. Additionally, the plurality of fasteners 250 used may be of any type deemed appropriate by one skilled in the art, including, but not limited to the nut and bolt configuration shown in FIGS. 3 and 6.

As shown in FIGS. 1 and 4, the first brace 80 may be configured to receive and be coupled to the second end 120 of the first member 100. The first brace 80 may include a pair of slots 81 configured to receive a plurality of fasteners 86. Each of the pair of slots 81 may include a serrated edge 85 that is configured to engage with the plurality of fasteners 150. The pair of slots 81, and the plurality of fasteners 150 may be configured to adjust an angle 87 of the first member 100 relative to the third member 300. The plurality of fasteners 150 used may be of any type deemed appropriate by one skilled in the art, including but not limited to the nut and bolt configuration shown in FIGS. 3-4. In one embodiment, as shown in FIG. 4, the first brace 80, and may be integrated with the third member 300, and U-bracket shaped. However, any shape or type of hardware may be used as deemed appropriate by on skilled in the art.

As shown in FIGS. 1 and 3-4, the second brace 80 may be configured to receive and be coupled to the second end 220 of the second member 200. The second brace 80 may include a pair of slots 83 configured to receive a plurality of fasteners 250. Each of the pair of slots 81 may include a serrated edge 85 that is configured to engage with the plurality of fasteners 250. The pair of slots 81, and the plurality of fasteners 250 may be configured to adjust an angle 89 of the second member 200 relative to the fourth member 400. The plurality of fasteners 250 used may be of any type deemed appropriate by one skilled in the art, including but not limited to the nut and bolt configuration shown in FIGS. 3-4. In one embodiment, as shown in FIG. 4, the second brace 82, and may be integrated with the fourth member 400, and U-bracket shaped. However, any shape or type of hardware may be used as deemed appropriate by on skilled in the art.

As shown in FIG. 6b, another embodiment of the solar panel foundation 40 may include the cross-brace 52. The cross-brace 52 may include a first end 74 and a second end 76. The first end 74 may be configured to couple to the first brace 80, and the second end 76 may be configured to couple to the second brace 82. The first end 74 and the second end 76 may each include a plurality of holes 84 configured to receive a plurality of fasteners 86. The cross-brace may be adjustable along a width 78 between the first brace 80 and the second brace 82 depending which of the plurality of holes 84 is selected to be used to fasten the cross-brace to the first brace 80 and the second brace 82.

As shown in FIGS. 2 and 5-6, another embodiment of the solar panel foundation 40 may include the cross-brace 52. The cross-brace 52 may include a first end 74 and a second end 76. The cross-brace 52 may be configured to be slidably adjustable between the first end 74 and the second end 76, along a predetermined width 78, as shown in FIG. 2. In a particular embodiment, as shown in FIG. 6a, the first end 74 of the cross-brace 52 may include the first brace 80 configured to accept the first member 100 and the second end 76 of the cross-brace 52 may include the second brace 82 configured to accept the second member 200. As shown in FIGS. 5-6, the first brace 80 and the second brace 82 may also include a plurality of holes 84 configured to receive fasteners. In one embodiment, as shown in FIG. 6a, the first brace 80 and the second brace 82 may be integrated with the cross-brace 52 and are U-brackets. However, any shape or type of hardware may be used as deemed appropriate by on skilled in the art.

In certain embodiments, such as shown in FIG. 6a, the cross-brace 52 may include a first panel 88 dispose alongside a second panel 90, allowing the cross-brace 52 to be slidably adjustable between the third member 300 and the fourth member 400 to a predetermined width 78. There may be a first panel slot 92 formed within the first panel 88, and a second panel slot 93 formed within the second panel 90. The first panel slot 92 of the first panel 88 may be configured to align with the second panel slot 93 of the second panel 90. The first panel slot 92 and the second panel slot 93 may each include a fastener panel 94, a first wing 96, and a second wing 98. The fastener panel 94 may be configured to secure the first panel 88 of the cross-brace 52 to the second panel 90 of the cross-brace 52 together once achieving the predetermined width 78, followed by securing with fasteners. The first wing 96 of the first panel 88 may be configured to abut the first wing 96 of the second panel 90. Concurrently, the second wing 98 of the first panel 88 may be configured to abut the second wing 98 of the second panel 90. The interface of the first wing 96 of the first panel 88 and of the second wing 98 of the second panel 90 may facilitate a sliding of the first panel 88 relative to the second panel 90 to the predetermined width 78. At the same time, the interface of the first wing 96 of and the second wing 98 of each the first panel 88 and the second panel 90 may further prevent the dislocation of the first panel 88 from the second panel 90, so that it may be easier to adjust to the predetermined width 78 and to fasten the first panel 88 to the second panel 90.

As shown in FIG. 3, in some embodiments, the first panel slot 92 and second panel slot 93 may be elongated. However, any shape or placement of the first panel slot 92, the second panel slot 93, the first wing 96, and the second wing 98, may be used as deemed appropriate by one skilled in the art. Additionally, any means of fastening the first panel 88 to the second panel 90 may be used as deemed appropriate by one skilled in the art, including, but not limited to the fastener panel 94 having an aperture 95 configured to receive fasteners, as shown in FIG. 3.

As shown in FIGS. 1 and 2, the third member 300 may include a first end 310 and a second end 320. As shown in FIGS. 3 and 6 the first end 310 may be configured to be coupled to the first brace 80. In certain embodiments, as shown in FIGS. 4 and 6, the first end 310 may be integrated with the first brace 80. The second end 320 of the third member 300 may be configured to be coupled to a first pile 340. The first pile 340 may be of any type as deemed appropriate by one skilled in the art, including, but not limited to ground screws, as shown in FIGS. 1, 2 and 10. Any means of fastening the third member 300 to the first pile 340 may be used as deemed appropriate by one skilled in the art, including, but not limited to screws, as shown in FIG. 1.

In certain embodiments, as shown in FIGS. 1 and 10, the third member 300 may be configured to be telescopic between the first end 310 and the second end 320. The third member 300 may include a locking mechanism 350 configure to fix a distance 360 between the first end 310 and the second end 320.

As shown in FIGS. 1 and 2, the fourth member 400 may include a first end 410 and a second end 420. As shown in FIGS. 3-6 the first end 410 may be configured to be coupled to the second brace 82. In a most particular embodiment, as shown in FIGS. 3-6, the first end 410 may be integrated with the second brace 82. The second end 420 of the fourth member 400 may be configured to be coupled to a second pile 440. The second pile 440 may be of any type as deemed appropriate by on skilled in the art, including, but not limited to ground screws, as shown in FIGS. 1, 2 and 10. Any means of fastening the fourth member 400 to the second pile 440 may be used as deemed appropriate by one skilled in the art, including, but not limited to screws, as shown in FIG. 1.

In certain embodiments, as shown in FIGS. 1 and 10, the fourth member 400 may be configured to be telescopic between the first end 410 and the second end 420. The third member 400 may include a locking mechanism 450 configure to fix a distance 460 between the first end 410 and the second end 420.

FIGS. 12a-12d show flowcharts representing a method 500 of building and installing a foundation system 40 in the surface 44 for supporting a solar panel 42. The method 500 may comprise several steps. A first step 501 may include providing a foundation system 40 for a solar panel 42, a first pile 340 and a second pile 440, and a solar panel 42, each configured to be coupled to the foundation system 40. The surface 44 may include any type on which a solar panel may be installed, including but is not limited to, soil of all types, frozen ground, concrete or other building materials, and surfaces of buildings or structures.

The foundation system 40 of the first step 501 may include, as shown in FIG. 1, a bracket 50 configured to be coupled to and support the solar panel 42. The solar panel foundation may have a first member 100, a second member 200, a first brace 80, a second brace 82, a third member 300, and a fourth member 400. The first member 100 may include a first end 110 and a second end 120, the first end 110 configured to be coupled to the bracket 50. The second member 200 may include a first end 210 and a second end 220, the first end 210 configured to be coupled to the bracket 50. The first brace 80 may be configured to be coupled to the second end 120 of the first member 100. The second brace 82 may be configured to be coupled to the second end 220 of the second member 200. The third member 300 may include a first end 310 and a second end 320, the first end 310 configured to be coupled to the first brace 80. The fourth member 400 may include a first end 410 and a second end 420, the first end 410 configured to be coupled to the second brace 82.

Figure 12A:
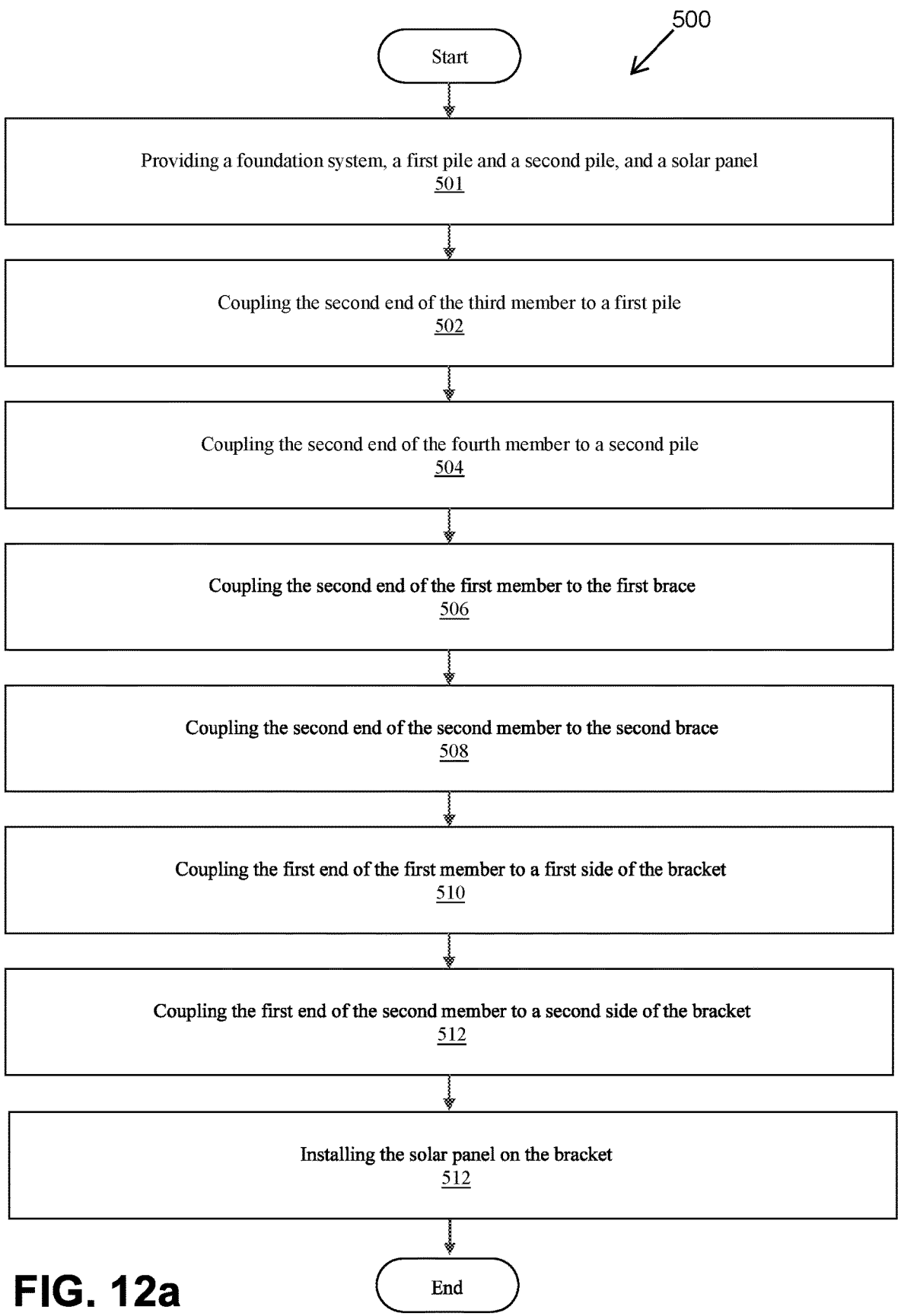

As shown in FIG. 12a, next, a step 502 of coupling the second end 320 of the third member 300 to a first pile 340 installed in the surface 44. Then, a step 504 of coupling the second end 420 of the fourth member 400 to the second pile 440 installed in the surface 44. Next, a step 506 of coupling the second end 120 of the first member 100 to the first brace 80, the first brace 80 receiving the first member 100. Then, a step 508 of coupling the second end 220 of the second member 200 to the second brace 82, the second brace 82 receiving the second member 200. Next, a step 510 of coupling the first end 110 of the first member 100 to a first side 54 of the bracket 50. Then, a step 512 of coupling the first end 210 of the second member 200 to a second side 56 of the bracket 54. Next, a step 514 of installing the solar panel 42 on the bracket 50.

Figure 12B:
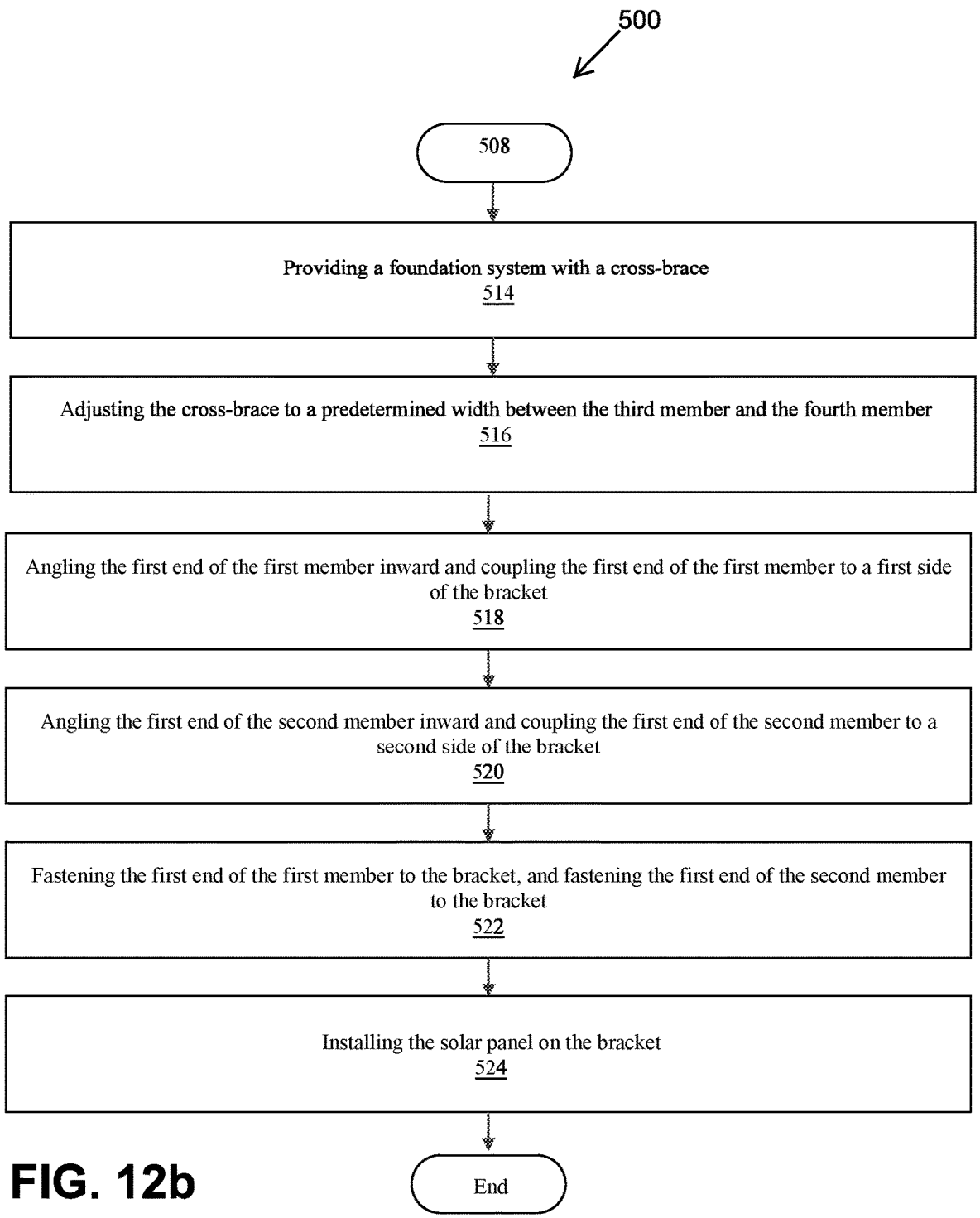

In a particular embodiment, as shown in FIG. 12b, the method 500 may include additional steps including a step 514 of providing a foundation system 40 with a cross-brace 52. As shown in FIG. 2, the cross-brace 52 may be configured to be slidably adjustable between a first end 74 and a second end 76, along a predetermined width 78. The first end 74 of the cross-brace 52 including the first brace 80 and the second end 76 of the cross-brace including the second brace 82.

Then, a step 516 of adjusting the cross-brace 52 to a predetermined width 78 between the third member 300 and the fourth member 400. Next, a step 518 of angling the first end 110 of the first member 100 inward, and coupling the first end 110 of the first member 100 to a first side 54 of the bracket 50. Next, a step 520 of angling the first end 210 of the first member 100 inward, coupling the first end 210 of the second member 200 to a second side 56 of the bracket 50 Then, a step 522 of fastening the first end 110 of the first member 100 to the bracket 50, and fastening the first end 210 of the second member 200 to the bracket 50. Finally, a step 524 of installing the solar panel 42 on the bracket 50.

In a particular embodiment, shown in FIG. 12c, the method 500 include additional steps including a step 526 of providing a cross-brace 52 further including a first panel 88 and a second panel 90, following the step 508. There may be a first panel slot 92 formed through the first panel 88 and a second panel slot 93 formed through the second panel 90. The first panel slot 92 of the first panel 88 may align with the second panel slot 93 of the second panel 90. The first panel slot 92 and the second panel slot 93 may have a fastener panel 94, a first wing 96, and a second wing 98. The fastener panel 94 may be configured to secure the first panel 88 to the second panel 90. The first wing 96 of the first panel 88 may be configured to rest on the first wing 96 of the second panel 90, and the second wing 98 of the first panel 88 may be configured to rest on the second wing 98 of the second panel 90.

Then the step of 526 resting the first panel 88 on the second panel 90. Next, a step 530 of aligning the first panel slot 92 of the first panel 88 with the second panel slot 93 of the second panel 90, by resting the first wing 96 and the second wing 98 of the first panel 88 on the first wing 96 and the second wing 98 of the second panel 90. Then, a step 532 of sliding the first panel 88 along the second panel 90 to the width 78 desired. Next, a step 534 of fastening the, by the fastening panel of the first panel 88 and of the second panel 90, the first panel 88 and the second panel 90 together. Then continuing with the step 510, shown in FIG. 12a.

Figure 12D:
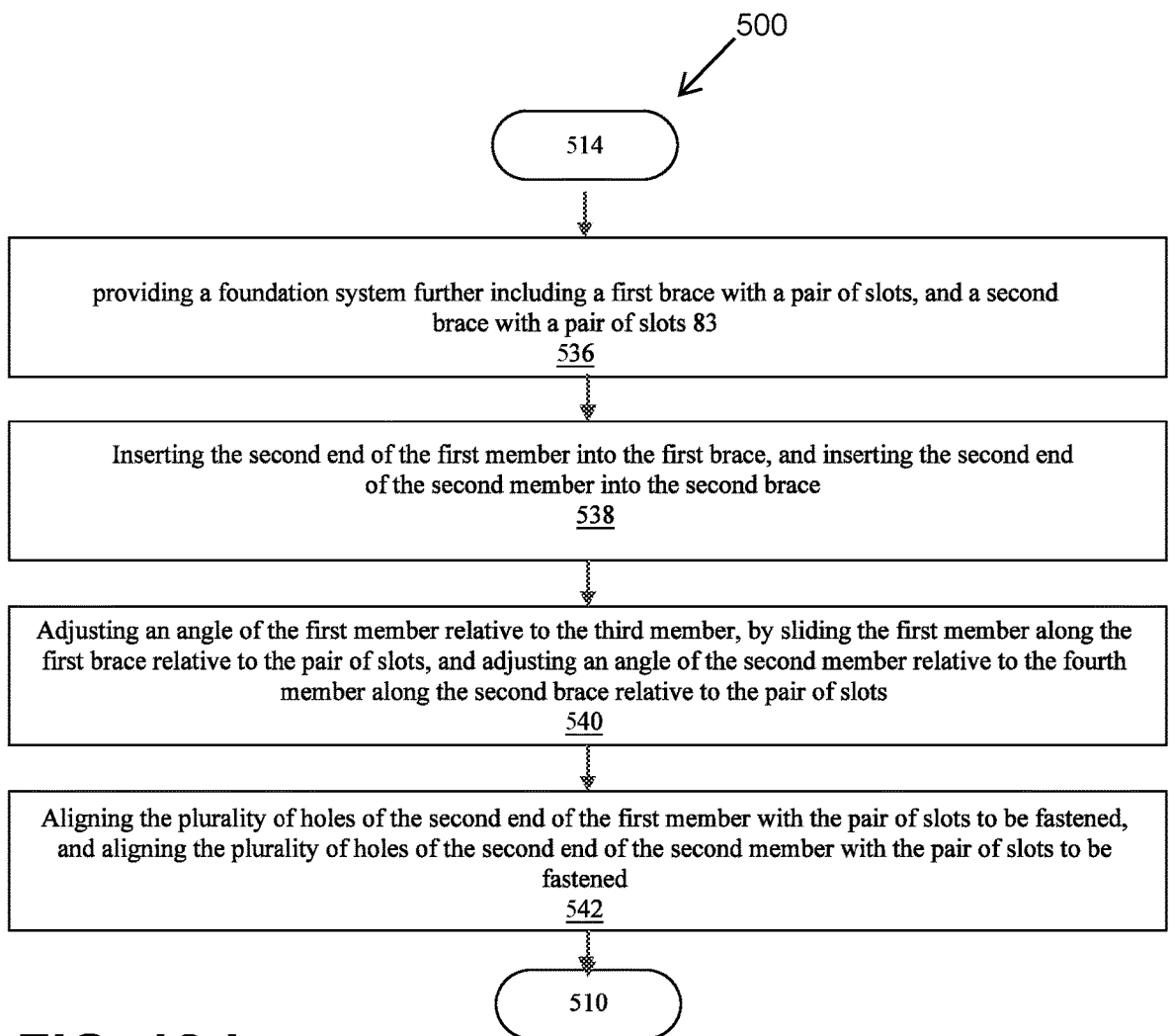

In another embodiment, as shown in FIG. 12d, the method 500 may include, after step 504 of coupling the second end 420 of the fourth member 400 to the second pile 440, a step 536 of providing a foundation system 40 further including a first brace 80 with a pair of slots 81, and a second brace 82 with a pair of slots 83, as shown in FIGS. 2 and 4. Next, a step 538 of inserting the second end 120 of the first member 100 into the first brace 80, and inserting the second end 220 of the second member 200 into the second brace 82. Then, a step 540 of adjusting an angle 87 of the first member 100 relative to the third member 300, by sliding the first member 100 along the first brace 80 relative to the pair of slots 81, and adjusting an angle 89 of the second member 200 relative to the fourth member 400, by sliding the second member 200 along the second brace 82 relative to the pair of slots 83. Next a step 542 of aligning the plurality of holes 140 of the second end 120 of the first member 100 with the pari of slots 81 to be fastened, and aligning the plurality of holes 240 of the second end 220 of the second member 200 with the pair of slots 83 to be fastened. Continuing with the step 512.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A foundation system for a solar panel, comprising:
a bracket configured to be coupled to and support the solar panel, the bracket including a first U-beam and a second U-beam coupled together, the bracket also including a first side configured to be coupled to a first attachment bracket, and a second side configured to be coupled to a second attachment bracket;
a first member including a first end and a second end, the first end configured to be coupled to the bracket, the first attachment bracket receiving the first end of the first member;
a second member including a first end and a second end, the first end configured to be coupled to the bracket, the second attachment bracket receiving the second end of the second member;
a first brace configured to be coupled to the second end of the first member;
a second brace configured to coupled to the second end of the second member;
a third member including a first end and a second end, the first end configured to be coupled to the first brace; and a fourth member including a first end and a second end, the first end configured to be coupled to the second brace.

2. The foundation system of claim 1, wherein a plurality of holes is formed through the first U-beam, the second U-beam, the first attachment bracket, and the second attachment bracket, the plurality of holes configured to accept a plurality of fasteners.

3. The foundation system of claim 1, wherein:
a plurality of holes is formed through the first end of the first member, and the plurality of holes is configured to receive a plurality of fasteners;
a plurality of holes is formed through the second end of the first member, and the plurality of holes is configured to receive a plurality of fasteners;
a plurality of holes is formed through the first end of the second member, and the plurality of holes is configured to receive a plurality of fasteners; and
a plurality of holes is formed through the second end of the second member, and the plurality of holes is configured to receive a plurality of fasteners.

4. The foundation system of claim 1, further comprising:
a first pile, wherein the second end of the third member is configured to be coupled to the first pile, the first pile configured to be disposed in a surface; and
a second pile, wherein the second end of the fourth member is configured to be coupled to the second pile, the second pile configured to be disposed in a surface.

5. A foundation system for a solar panel, comprising:
a bracket configured to be coupled to and support the solar panel:
a first member including a first end and a second end, the first end configured to be coupled to the bracket;
a second member including a first end and a second end, the first end configured to be coupled to the bracket;
a first brace configured to be coupled to the second end of the first member;
a second brace configured to coupled to the second end of the second member;
a third member including a first end and a second end, the first end configured to be coupled to the first brace;
a fourth member including a first end and a second end, the first end configured to be coupled to the second brace; and
a cross-brace including a first end and a second end, the cross-brace configured to be slidably adjustable between the first end and the second end, the first end of the cross-brace including the first brace and the second end of the cross-brace including the second brace and the cross-brace includes a first panel disposed alongside a second panel, the first panel including the first end, the second panel including the second end, the first panel and the second panel configured to be slidably adjustable to change a width between the first end and the second end, the first panel includes a first panel slot and the second panel includes a second panel slot, the first panel slot and the second panel slot configured to align with each other, each of the first panel slot and the second panel slot includes a first wing, a second wing, and a fastener panel configured to receive a fastener to secure the first panel and the second panel together, the first wing of the first panel slot configured to abut the first wing of the second panel slot, and the second wing of the first panel slot configured abut the second wing of the second panel slot.

6. The foundation system of claim 5, wherein a plurality of holes is formed through each of the first brace and the second brace, the plurality of holes configured to accept a plurality of fasteners.

* * * * *